Sept. 5, 1950 E. W. BALDWIN 2,521,323
HAY CUTTING DEVICE
Filed May 13, 1949 3 Sheets-Sheet 1
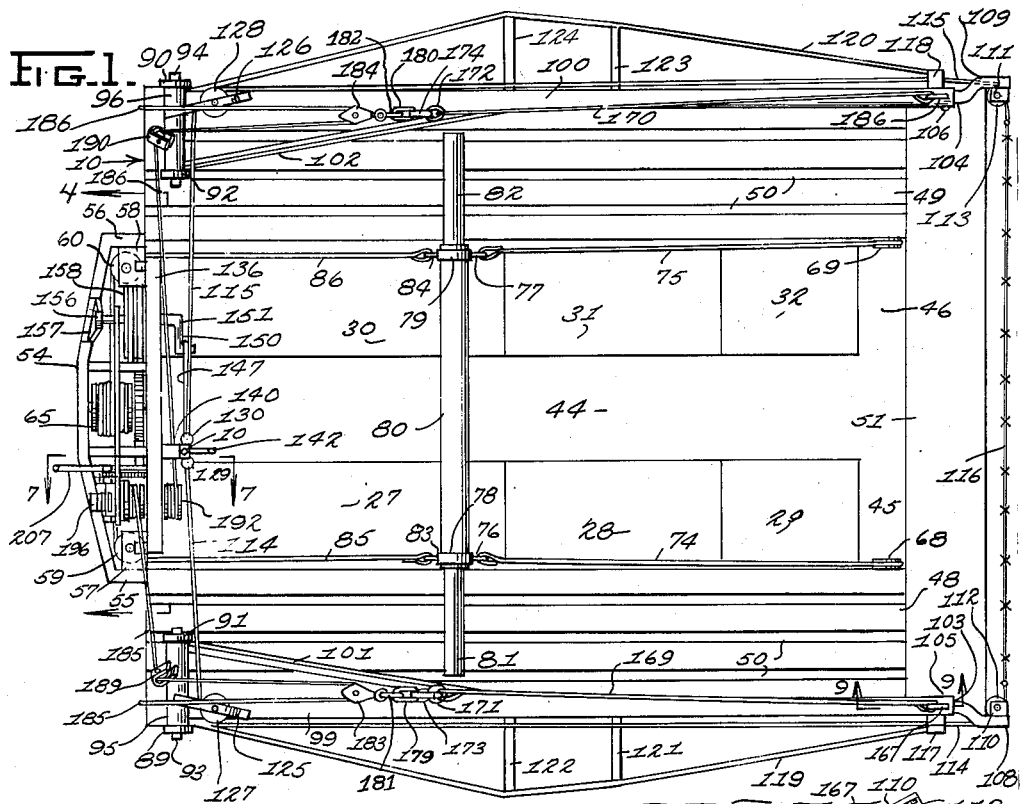
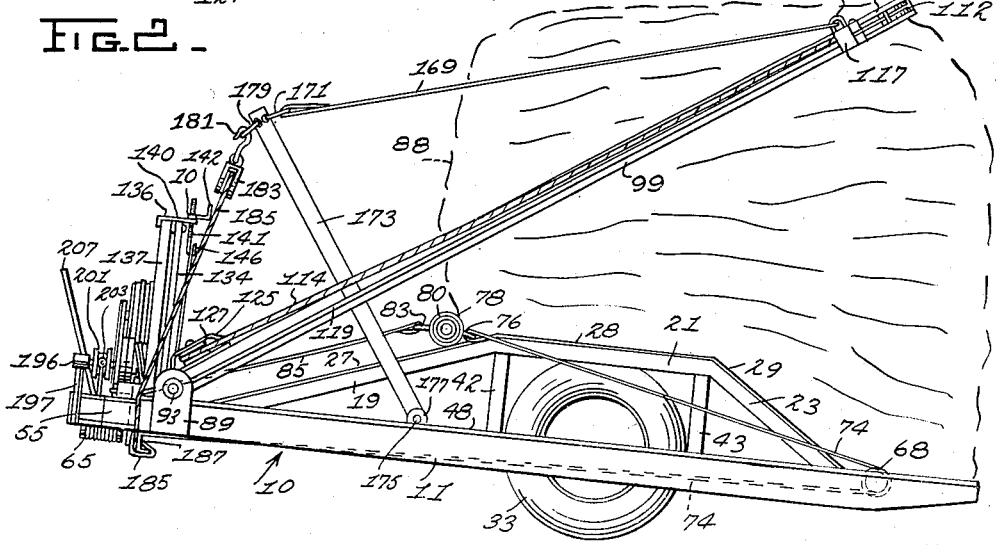
INVENTOR.
ELMER W. BALDWIN
BY
McMorrow, Berman & Davidson
ATTORNEYS Sept. 5, 1950 E. W. BALDWIN 2,521,323
HAY CUTTING DEVICE
Filed May 13, 1949 3 Sheets-Sheet 2
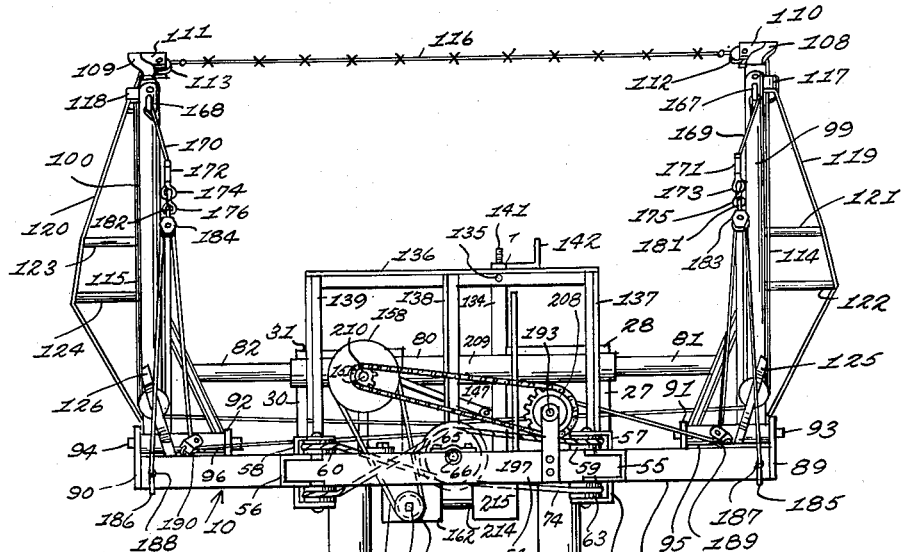
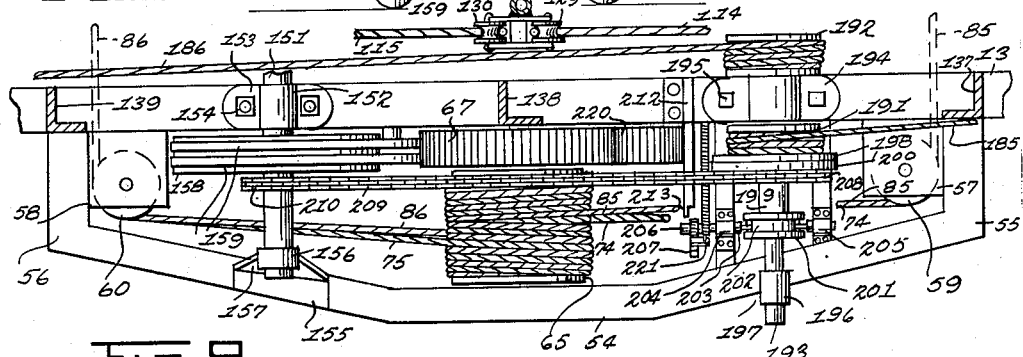
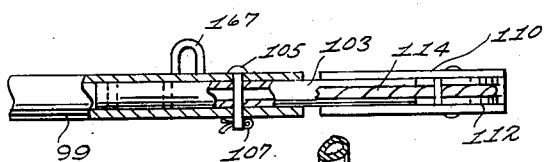
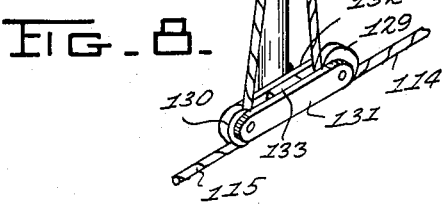
INVENTOR.
ELMER W. BALDWIN
BY
McMorrow, Berman & Davidson
ATTORNEYS

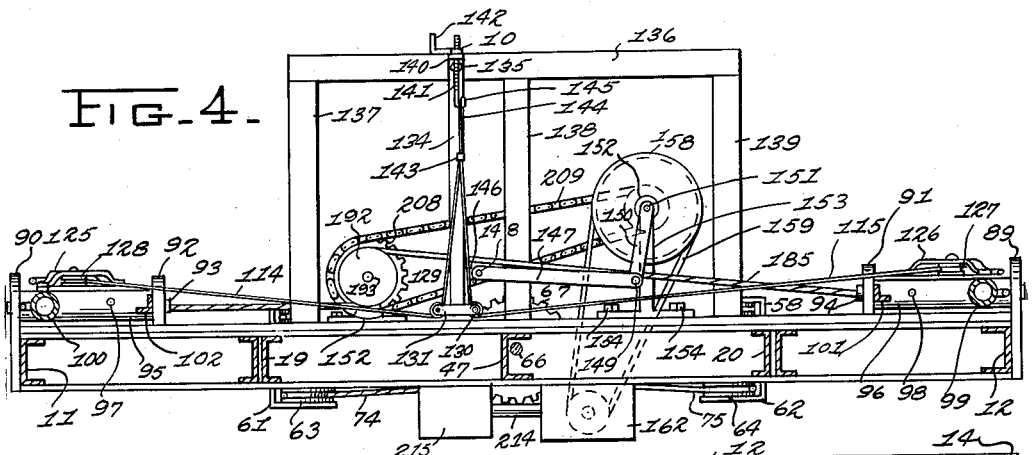

Patented Sept. 5, 1950

2,521,323

UNITED STATES PATENT OFFICE 2,521,323

HAY CUTTING DEVICE

Elmer W. Baldwin, Bassett, Nebr.

Application May 13, 1949, Serial No. 93,094

8 Claims. (Cl. 146—137)

This invention relates to apparatus for handling and cutting hay, deriving its power from a tractor or the like, and particularly to a powered hay cutting device.

The main object of my invention is to provide means capable of receiving a load of hay to be cut and cutting the same into lengths or portions of desired size to facilitate subsequent handling of the hay, especially at feeding time.

Another object is to provide a tractor-drawn hay carrier or truck with means for feeding or shifting the hay load periodically toward a cutting position and preventing undesired return movement or backlash of the hay during the cutting operation.

A further object is to support the hay on such a carrier with a transversely-disposed cutting member operating from above downward, or vice versa, at the rear of the carrier.

It is also an object to suspend and operate a cutting member between a pair of downwardly-swinging booms which serve to ballast the cutting member and contribute to the effectiveness of the latter during operation.

A practical object is, of course, to have a hay-cutting device as indicated which is simple to operate and effective in use, and capable of being transported to any site for operation.

Other objects and advantages of the invention will appear in further detail as the specification proceeds.

In order to facilitate ready comprehension of this invention for a proper appreciation of the salient features thereof, the invention is illustrated on the accompanying drawings forming part hereof, and in which:

Figure 1 is a top or plan view of a tractor-powered, hay-cutting device made according to the invention and embodying the same in a practical form;

Figure 2 is a side elevation of the same hay-cutting device as seen from below in Figure 1;

Figure 3 is a front elevation of the same hay-cutting device as seen from the left in Figure 2;

Figure 4 is an enlarged transverse section taken on line 4—4 in Figure 1;

Figure 5 is a top or plan view similar to that of Figure 1, but with the entire superstructure removed to disclose the nature of the framework of the carrier;

Figure 6 is an enlarged fragmentary plan view substantially of the structure shown in Figure 4, but as seen from the left in Figures 1 and 2, or as seen from above in Figure 3;

Figure 7 is a fragmentary section taken on line 7—7 in Figure 1;

Figure 8 is an enlarged fragmentary perspective showing detail of the parts uppermost in Figure 6;

Figure 9 is a fragmentary enlarged section taken on line 9—9 in Figure 1.

Throughout the views, the same reference numerals indicate the same or like parts.

On farms and larger estates where hay is harvested and thereafter used for feeding horses and cattle, it is often a matter of guesswork to apportion a proper amount of hay to each animal without too great variation, and the normally long condition of hay increases the difficulty of properly distributing for feeding purposes. The length of the hay also impedes appropriation thereof by the animals in economical manner, not to mention that scattering of some of the hay occurs with consequent waste thereof. While I am aware that means have already been proposed for cutting hay after a fashion, the situation still remains a problem, inasmuch as nothing practical has been generally adopted for this purpose.

Upon considering this problem, it has occurred to me that a tractor-drawn, hay-carrying vehicle could well be equipped with means driven from the tractor for cutting a load of hay thereon into desired portions or lengths facilitating handling of the hay for all purposes thereafter. As a result of such consideration, I have succeeded in producing a hay-cutting device which will now be more fully described.

Hence, in the practice of my invention, and referring again to the drawings, a trailer truck forming a hay carrier, generally indicated at 10, primarily includes a substantially rectangular frame forming a platform built up from a plurality of channel irons. Thus, a pair of longitudinal channel members 11 and 12 form the extreme sides of the frame and connected thereto at the ends thereof are a pair of front and rear channel members 13 and 14. Transversely disposed between the side frame members 11 and 12 are a group of further channel members 15, 16, 17 and 18 spaced apart and substantially parallel with the front and rear channel members 13 and 14. Intermediate the side channel members 11 and 12 are further channel members 19 and 20 which extend from the forward channel member 13 to one of the intermediate channel irons 16 in upwardly-inclined position and rearwardly of the higher rear ends of the upwardly-inclined members 19 and 20 are a pair of relatively short, horizontal race channel members 21 and 22 which extend from the transverse channel members 16 to channel members 17, while rearwardly of the latter the mentioned channel members slope downwardly again at 23, 24 to the level of the side channel irons 11 and 12 and transverse channel member 18, from which the mentioned channel members continue horizontally at 25, 26 from transverse channel 18 to the rear channel member 14. As best seen in Figure 2, the raised horizontal portions 21 and 22 of the channel members just described are supported at both ends by upright supports 42 and 43, while, as may be seen in Figure 1, the frame or platform framework thus far described is covered from the side channels 11 and 12 to the intermediate channel members 19, 21, 23 and 25 on one side, and 20, 22, 24 and 26 on the other side by sheet metal platform members 27, 28, 29, 30, 31 and 32, among which the forward portions 27 and 30 are inclined upwardly, the sections 28 and 31 being at a higher level and substantially horizontal, while the rear plate portions 29 and 32 are inclined downwardly from the raised portions 28 and 31.

Intermediate the higher channel members 21 and 22 and the transverse channel members 16 and 17 are mounted two pairs of tire-equipped wheels 33 and 34 on an axle 35 secured beneath a pair of short frame members 36 and 37 secured between transverse channel members 16 and 17, the nature of the axle and the wheels being so conventional as not to form any part of the invention as such, and therefore superfluous to illustrate in detail. Extending longitudinally between side channel irons 11 and 12 and the intermediate channel members 19, 21, 23 and 25 on one side, and 20, 22, 24 and 26 on the other side are a pair of elongated reinforcing members 38, 39 extending from the front channel member 13 to the rearward transverse channel member 18 and in the intermediate section of the frame extending from forward channel member 15 to the rear channel member 14 is a further pair of elongated reinforcing members 40 and 41 disposed between the wheels 33, 34 and the short channel members 36 and 37, and contributing to the mounting of axle 35. The raised sheet metal portions 28 and 31 mounted upon the channel members 21 and 22 serve to conceal the wheels 33 and 34, while intermediate the wheels a substantially flat elongated sheet metal member 44 extends from front channel member 13 substantially to the rear channel member 18 and beneath the rearwardly-inclined sheet metal portions 29 and 32 this member widens at 45, 46 toward the inclined channel members 23 and 24. The forward end of the mentioned sheet metal plate 44 is supported by an intermediate short channel member 47 extending from the front channel member 13 to the second member 15 and spaced within the same on the frame. All of the frame members, such as the channel reinforcing members and the like, may be welded, brazed or riveted together so that a strong and dependable frame results.

Upon the side sections of the frame thus far described are a pair of long metal sheets 48 and 49 secured upon the side channels 11 and 12 and the portions of front and rear channels 13 and 14 and the intermediate channels 15, 16, 17 and 18 at the sides of the raised channel portions 19, 21, 23 and 25 on the one side and 20, 22, 24 and 26 on the other, the two sheets 48 and 49 being provided with longitudinally-arranged and spaced slats or ribs 50, 50 to facilitate rearward movement of hay on the resulting platform of the carrier. To finish off the rear, a transverse sheet metal plate 51 extends from side channel 11 to side channel 12 and forwardly so as to meet and even overlap slightly the rear ends of the sheets 44, 48 and 49. The rear corners are further reinforced by a pair of short frame members 52 and 53 spaced between side channels 11 and 12 and the intermediate rear channel members 25 and 26 and secured at the ends thereof to the two rear channels 14 and 18. The carrier platform and body thus far described need not be constructed in detail as already outlined, but can, of course, be varied, inasmuch as it merely forms a support for the operating parts now to be described.

Upon the front end of the frame and particularly channel member 13, is secured a forwardly-extending frame 54 having the ends 55 and 56 thereof directed rearwardly and secured to the mentioned from channel member by welding brazing or riveting. Upon the inner sides of end frame members 55 and 56 are fixed a pair of pulley yokes 57 and 58 in which are rotatably mounted a pair of grooved pulleys 59 and 60 rotatable upon substantially vertical axes. As best seen in Figure 3, it may be noted that upon the ends 55 and 56 are mounted further pulley yokes 61 and 62 directly beneath the previously-mentioned pulley yokes 57 and 58 and in which are rotatably mounted further grooved pulleys 63 and 64. Intermediate the ends 55 and 56 of the projecing frame 54 is mounted a reel 65 on a shaft 66, as best seen in Figures 3 and 4, this shaft being rotatably mounted in the central portion of the front frame 54 and front channel member 13 and provided with a gear 67 by which it is driven in a manner which will presently be explained. Rearwardly in line with the outer sides of pulleys 59, 60, 63, 64 are mounted a pair of rear pulleys, best seen in Figures 1 and 2 in bearings or supporting brackets 70 and 71 with horizontal pivot shafts 72 and 73, as best seen in Figure 5.

Over the rear pulleys 68 and 69 are passed a pair of forwardly-extending cables 74 and 75 secured to anchoring eyes 76 and 77 at the forward ends thereof, these eyes being secured to a pair of rings or collars 78 and 79 mounted upon an intermediate transverse bar 80 resting slidably upon the upwardly-inclined sheet metal plates 27 and 30 of the carrier 10. The mentioned transverse bar 80 has axially-extending, reduced portions 81 and 82 extending over the side plates 48 and 49 so that the total length of the transverse bar 80 and its extensions 81 and 82 is very nearly that of the width of the platform formed by the entire frame of the hay carrier and serves as a hay feeder for shifting the hay load rearwardly for the cutting operation which will be described later on. Upon the previously-mentioned rings or collars 78 and 79 on feed bar 80 are fixed a pair of forwardly-directed eyes 83 and 84 through which a pair of forwardly-extending cables 85 and 86 are connected, these cables passing over the forwardly-located upper grooved pulleys 59 and 60, and from the latter pulleys extend to the reel or winch 65 upon which they are wound. At the same time, the rearwardly-extending cables 74 and 75 which pass over rear pulleys 68 and 69 beneath the latter extend forwardly to the lower pulleys 63 and 64 and from the latter also extend inwardly at the forward end of the apparatus to the same winch or reel 65 upon which these cables are wound.

The arrangement is such that if reel 65 is rotated by any means in one direction so as to wind up the upper forward cables 85, 86 simultaneously unwind the lower cables 74 and 75, the feed bar 80 will be shifted forwardly down the inclined plates 27 and 30. If, on the other hand, reel 65 is rotated clockwise in a direction to wind up the lower cables 74 and 75 and simultaneously unwind cables 85 and 86, the transverse feed bar 80 will be shifted upwardly along the inclined portions 27 and 30 of the platform. Normally, the feed bar 80 serves to engage against the lower portion of a hay load indicated at 88 resting on the platform, and obviously such feeding movement of bar 80 is not continuous ordinarily, but caused to be intermittent according to the requirement for shifting the load with respect to a rearwardly-disposed cutter yet to be described.

At the forward corners of the frame or platform are fixed a pair of upright lugs 89 and 90, and a short distance inwardly upon the platform within the mentioned lugs are fixed a pair of further corresponding lugs 91 and 92, the lugs being arranged in pairs with the first-mentioned lugs 89 and 90. The two lugs 89 and 91 form bearings for the shaft 93 extending therethrough, while the other lugs 90 and 92 in a similar fashion support a shaft 94. Upon the shafts 93 and 94 are mounted a pair of sleeves 95 and 96 secured by pins 97 and 98, as best seen in Figure 4, so that shafts 93 and 94 are substantially rigid with the sleeves 95 and 96 and rotate therewith in the supporting lugs supporting the shafts. Upon the mentioned sleeves 95 and 96 are secured by welding or brazing a pair of long booms 99 and 100 adjacent the outer ends of the sleeves immediately within lugs 89 and 90, while upon the same sleeves are fixed at the other ends thereof a pair of inclined stays or braces 101 and 102 which at the other ends thereof are brazed or welded to the opposite facing sides of booms 99 and 100, so that the latter are thus rigidly fixed to the sleeves 95 and 96 and swingable therewith upon shafts 93 and 94 with the lugs just described pivotally supporting the booms which are of sufficient length to reach substantially to the rear end of the side channels 11 and 12 when lowered upon the latter. The mentioned booms are preferably tubular in form and at the rear free ends thereof a pair of tubular extensions 103 and 104 are inserted and secured by rivets or transverse pins 105 and 106, which in turn are prevented from dropping out of position by cotter pins 107, all as best shown in Figure 9. The outer ends of extensions 103 and 104 are offset at 108 and 109 so as to separate them further in the outward direction, while upon their inner opposite sides they are provided with lugs 111 pivotally supporting a pair of grooved pulleys or rollers 112 and 113 over which a pair of cables 114 and 115 are passed, while to the ends of these cables between pulleys 112 and 113 a barbed wire, thin wire saw or saw blade 116 is connected in tense condition. Before proceeding to note further the operation as well as the mounting of the saw blade or wire 116, it is to be noted that inasmuch as the two booms 99 and 100 are obviously under considerable inward strain tending to draw the free ends thereof together, they are further reinforced in addition to the provision of braces 101 and 102. Thus, adjacent to the outer end of boom 99 is a U-shaped yoke 117 welded or brazed thereto and similarly the other boom 100 has a corresponding yoke 118 secured thereto, and to these yokes are brazed or welded rearwardly and outwardly-extending truss rods 119 and 120, which extend forwardly and upon the intermediate portions of the outer sides of the booms are extended by a pair of oppositely-outwardly-projecting spaced posts 121 and 122 on one side and 123 and 124 on the other side, beyond which rods 119 and 120 are inclined inwardly again toward the booms and secured thereto adjacent to the sleeves 95 and 96 to which the booms are secured at the forward end thereof, by brazing or welding the rods to the booms. Thus, the latter will resist inward stresses occasioned by the tension of saw wire 116. Upon the forward ends of the booms and upon sleeves 95 and 96 are secured pulley brackets 125 and 126 in which are pivotally mounted a pair of grooved pulleys 127 and 128 to which the previously-mentioned cables 114 and 115 extend forwardly from the rear pulleys 112 and 113 on the free ends of the booms. From the last-mentioned forwardly-located pulleys 127 and 128 the cables 114 and 115 are brought inwardly toward each other, and as best seen in Figure 8, are passed over a pair of further pulleys 129 and 130 pivotally mounted between a pair of bars 131 and 132 secured together by an intermediate block 133 and together secured as a unit to the lower end of a rocker arm 134. This rocker arm is pendently supported upon a pivot pin 135 secured to an upper cross-piece 136 supported in elevated position by three spaced posts 137, 138, 139 fixed upon the front channel member 13 of the platform. Above the pivot mounting 135 rocker arm 134 is formed into a rearwardly-extending lug 140 through which a vertical adjusting screw 141 extends slidably with the upper threaded end of the screw engaged by an adjusting nut 10 provided with a crank 142 for rotating the nut and thereby adjusting the screw up or down in ledge or lug 140. The previously-mentioned cables 114 and 115 are brought up past pulleys 129 and 130 at the lower end of rocker arm 135 through a cable clip 143 secured upon an intermediate portion thereof, and past this clip to form a loop 144 engaging with a hook 145 formed upon the lower end of adjusting screw 141. The arrangement is such that by adjusting the screw up or down by way of crank 142, the cables 114 and 115 may be slacked or tightened in such fashion as to increase or decrease the tension upon the transversely-disposed rear cutting wire 116 suspended between pulleys 112 and 113 at the rear ends of the boom members 99 and 100.

The purpose of rocker arm 134 is to provide sawing motion to the cutting wire 116 by pulling first upon one cable 114 and then upon the other, and correspondingly letting out the other cable so that the cutting wire 116 will ride back and forth transversely of the rear end of the platform and thus saw its way down through the hay load 88 from the raised position shown in Figure 2, or if the booms are disposed in their lowest position alongside side frame channels 11 and 12, by sawing its way up through the same load, thereby cutting off a length of the hay pile which will drop behind the platform on the ground or upon some surface rearwardly of the carrier intended to receive the hay thus cut. In order to oscillate the rocker arm 134 upon its pivot mounting 135, the arm is provided a short distance above the lower end thereof with a lug 146 to which is pivotally connected a link or pitman 147 by a pivot pin 148, while at the other end the link is connected at 149 with a crank 150 fixed upon a shaft 151 rotatably mounted in a bearing 152 upon the upper end of a post 153 secured upon the front end 13 of the carrier by means of bolts 154. A second bearing for the mentioned shaft 151 is shown mounted in Figures 1 and 6 on the front frame 54 at 155, the bearing 156 supporting shaft 151 being supported on the upwardly-extending supporting plate 157 fixed on the base 155. Intermediate the bearings 153 and 156 and adjacent to the front journal 13, shaft 151 is provided with a double-grooved pulley 158 connected by belts 159 to a relatively smaller driving pulley 160 fixed on a power take-off shaft 161 extending forwardly from a gear box 162 supported immediately within and partly below front channel member 13 by means of a pair of brackets 165 secured to the top of gear box 162 and to the central channel member 47 intermediate transverse channels 13 and 15, as best seen in Figure 5. While on the subject of the take-off shaft 161, which is adapted to be connected to a tractor furnishing the power to the apparatus, the tractor is for this purpose also mechanically connected to carrier 10 by means of a draw bar yoke including members secured to arms 164, 164 converging forwardly and being attached to the tractor, while rearwardly their diverging ends are connected by rivets or pivot pins 165, 165 to angle plates 166, 166 which in turn are secured to the transverse channel member 15 within the front portion of the carrier. The arrangement is such that when the engine of the tractor is operating, and assuming that the power take-off shaft 161 is connected to the power drive of the tractor, pulley 160 will be rotated, which also results in rotation of pulley 158 through belts 159, 159. The immediate result is that shaft 151 is rotated with its rear crank 150, whereby the pitman or link 147 is oscillated from side to side, and as the latter is connected to the lower end of rocker arm 134, the latter will rock from side to side like a pendulum from its upper pivotal mounting 135, drawing cables 114 and 115 alternatively in such fashion that pulleys 127 and 112 on one side and 128 and 113 on the other side through yokes 117 and 118 as to oscillate cutting wire 116 along its own length transversely of the rear end of the hay carrier. It is to be noted that such oscillation of the cutting wire 116 will occur in any position of the booms 99 and 100, the cutting wire 116 being raised or lowered upon the booms through an arc centered about the axes of shafts 93 and 94 at the front of the carrier. When the cutting operation is done, the cutting movement or oscillation of the cutting wire 116 may continue indefinitely, as it is innocuous and does not interfere with any other operation intended to be performed by the apparatus before or after the cutting is done, and this is especially true when the booms are in their lowered position substantially parallel to the side channels 11 and 12.

In order to promote a proper sawing operation upon the hay load 88, both in the upward, as well as the downward direction, certain additional means are included for raising and lowering the booms, the latter having a pair of attachment yokes 167 and 168. To these loops or eyes 167 and 168 are attached a pair of elevating cables 169 and 170. At the other ends the cable lengths 169 and 170 are connected to a pair of rings or loops 171 and 172 upon the upper ends of a pair of swingable supports 173 and 174 which are pivoted upon the carrier at the sides by means of pivot pins 175 and 176 extending through lugs 177 and 178 on the carrier, only pivot pin 175 and lug 177 being claimed and shown, Figure 2. Upon the upper ends of the mentioned rocking supports 173 and 174 a pair of further rings or loops 179 and 180 are attached facing the trailer front, and which in turn are attached to upper hooks 181 and 182 on a pair of pulley blocks 183 and 184. At the forward corners of the carrier a pair of cables 185 and 186 are anchored beneath the front channel member 13 and secured thereto by fasteners or knots on the cables extending through holes 187 and 188, these cables extending upwardly through blocks 183 and 184 and then downwardly again through a pair of further blocks 189 and 190 attached in association with sleeves 95 and 96. From the latter blocks which are secured at the forward end upon the carrier, as intimated, cables 185 and 186 extend inwardly generally toward each other and are wound upon a pair of individual reels 191 and 192 fixed upon a shaft 193 upon opposite sides of a bearing 194 rotatably supporting the shaft and secured by bolts or screws 195 upon front channel member 13. The arrangement is such that if any means serves to rotate shaft 193 with its reels 191 and 192 in counter-clockwise direction, both cables 185 and 186 will begin to be wound up on the reels and will force the supports 173 and 174 to rock forwardly and bring with them cable lengths 169 and 170, thereby raising the booms 99 and 100. When rotation occurs in the opposite direction, that is, clockwise, the reels 191 and 192 will unreel the cables 185 and 186 and allow the booms 99 and 100 to lower about their centers 93 and 94 by gravity until they finally reach the side channels 11 and 12. In order to ensure that shaft 193 will rotate properly, a forward bearing 196 supports the forward end and is mounted upon a post 197 secured upon front channel 13. For the purpose of rotating the shaft 193 and reels 191 and 192, the first-mentioned reel is provided at one end with a clutch disc 198, while upon shaft 193 between bearings 194 and 196 is rotatably mounted a clutch sleeve 199 upon one end of which is fixed a second clutch disc 200 capable of engaging frictionally against disc 198, while upon the other end of the sleeve is a grooved collar 201 having a groove 202 therein. A clutch fork 203 engages in groove 202 of collar 201 and is pivotally mounted in bearings 204 and 205 in connection with front frame 54, while the shaft 206 of the clutch fork is provided with a manually-operated lever 207 by which it is possible to shift sleeve 199 along shaft 193 in order to move disc 200 against disc 198 or remove it from contact therewith.

Upon sleeve 199 adjacent to the clutch disc 200 is fixed a sprocket 208 connected by a chain 209 to a relatively smaller driving sprocket 210 on shaft 151, which also carries pulley 158 and is driven from power take-off shaft 161. Thus, if manual lever 207, on shaft 206 with tension spring 211 connected thereto and rearwardly at the rear end thereof to front channel 13 is pulled forwardly, fork 203 cooperating with groove 202 in shifting collar 201 will shift sleeve 199 with its disc 200 in the forward direction away from disc 198 and reels 191 and 192 will remain stationary provided that the booms 99 and 100 either are down in their lowest position or are supported upon the hay load 88 by the transversely-disposed cutting wire 116. If power take-off shaft 161 is rotated by connection to the tractor which causes operation of pulleys 160 and 158, crank 150 will be rotated and through link or pitman 147 will rock pendently-pivoted arm 134 and thereby cause the cutting or sawing wire 116 to move alternately from side to side and thereby cut its way down through the hay 88 by the weight of booms 99 and 100. With the discs 198 and 200 out of contact, such movement easily occurs as reels 191 and 192 are then free to be rotated clockwise by simultaneous pull on cables 185 and 186 connected to supports 173 and through cable lengths 169 and 170 to the upper ends of both booms. On the other hand, when lever 207 is pushed rearwardly, clutch fork 203 engaging in groove 202 of collar 201 will shift sleeve 199 rearwardly and bring clutch disc 200 into effective contact with disc 198 fixed on shaft 193 and will thereby rotate the latter and the reels 191 and 192, causing them to rotate in a counterclockwise direction and thereby reel up part of cables 185 and 186 and thereby lift the booms. If both booms are started at their lowest position substantially parallel to the lowest portion of the platform, that is, to the side channels 11 and 12, and the handle or lever 207 is pushed just enough to cause a gradual slipping transmission of power from disc 200 to disc 198, the reeling up of cables 185 and 186 will proceed slowly enough to allow the cutting wire 116 to saw its way upward through the hay load 88 until the booms reach the top of the pile, when lever 207 may again be swung outwardly to disengage the clutch. One of the two clutch discs, such as disc 200, may have brake lining of leather or any other frictional material, such as plastic or fabric or the like, 222, cemented or riveted thereto in order to provide ample friction against the face of the other disc, if so desired.

In order to hold the clutch normally in neutral position when cutting the hay from the top down by means of cutting wire or saw 116, a forwardly-extending stop 212 is fixed on front channel 13 and provided with a shoulder or recess 213 serving to hold lever 207 in forward position. When booms 99 and 100 are being raised, the tension spring in exerting tension on lever 207 tends to hold clutch discs 198 and 200 together, the spring being originally adjusted to allow just the right amount of slippage between the discs to provide the proper pressure required on cutting wire or tension saw 116 when the same is cutting in the upward direction.

Returning to the gear box 162 beneath the front end of the carrier, power take-off shaft 161 within the same is provided with appropriate gearing connected to or meshing with further gearing in such fashion as to rotate a transverse shaft 214 extending from the side of gear box 162 into a second gear box 215 secured in a similar fashion to gear box 162 by means of brackets 216 which in turn may either be continuations of the previously-mentioned brackets 163 or independently secured to the center channel member 47. Gear box 215 preferably contains a worm 217 on the end of the shaft 214 engaging a worm gear 218 and a rotatable and forwardly-extending shaft 219 upon the front end of which is fixed a pinion 220 meshing with previously-mentioned or described gear 67 associated with reel or winch 65.

The arrangement is such that assuming that the power take-off shaft is coupled to the drive of the tractor connected by drawbar members 164 to the carrier 10, rotation of the shaft will cause simultaneous rotation of shaft 151 through belt 159, rotating crank 150, and thereby swinging rocker arm 134 and causing oscillation of cutting or sawing wire 116 at the rear and between booms 99 and 100. If the latter are in the lowest position, which they will be after each downward cut by gravity, swinging handle or lever 207 rearwardly in the direction of tension spring 211 assisting such movement, clutch fork 203 will shift collar 201 and thereby sleeve 199 and its clutch disc 200 with its leather facing 202 rearwardly against reel disc 198 and according to the pressure applied to lever 207, the reels 191 and 192 will be rotated slowly or rapidly with consequent gradual raising of booms 99 and 100 and upward cutting of cutting or sawing wire 116 through the hay pile 88. Inasmuch as the gearing within gear box 162 also communicates rotation through shaft 214 between the boxes to gear box 215 and thereby through shaft 219 to pinion 220, the latter in meshing with gear 67 will rotate reel 65 and cause gradual travel of transverse feed bar 80 up along the incline formed by plates 27 and 30 and also along the upper plates 28 and 31 and will thereby feed the hay pile 88 rearwardly toward the cutting wire 116. If required, some manual control for the transmission in gear boxes 162 and 215 may be provided to interrupt operation so that feed bar 80 may remain stationary at various spaced positions along the carrier, if so desired.

From the foregoing, it is evident that so long as power drive is supplied by a tractor to which the apparatus is attached as a trailer, any amount of hay may be cut upwardly and downwardly with considerable output of cut hay without much manual exertion. The portions cut will be suitable portions to be fed to horses and cattle and will facilitate handling the hay both by persons feeding the animals and by the animals themselves to appropriate the benefit of the hay for feeding purposes.

Manifestly, variations may be resorted to and parts and features may be modified or used without others within the scope of the appended claims.

Having now fully described my invention, I claim:

1. A hay-cutting device including a platform, wheels supporting the platform, means for connecting the platform to a tractor as a trailer thereto, a power-take-off shaft rotatably mounted on the platform and adapted to be driven from said tractor, a pair of rearwardly-directed side booms spaced apart and pivotally mounted at two forward portions on said platform, a pair of upwardly-directed supports pivotally mounted on the platform at the lower ends thereof rearwardly of the pivot mountings of the side booms, a pair of cables connecting the upper ends of the supports to the booms adjacent to the rear ends thereof, a pair of pulleys rotatably mounted upon the rear ends of the booms, a further pair of pulleys rotatably mounted adjacent to the forward pivoted ends thereof, a pair of operating cables extending from one pulley to the other individually on both booms, a tension saw connected to the ends of both operating cables between the one or first pair of pulleys at the rear ends of said booms, means driven from the power take-off shaft connected to the other ends of the operating cables for drawing them alternately in opposite directions and thereby oscillating the tension saw along its length transversely of said booms, reel means rotatably mounted on the forward portions of the platform, elevating cables connected to the upper ends of both supports and partly coiled on the reel means, means for communicating rotation to said reel means at will from said power take-off shaft for rotating said reel means in one direction to wind up said elevating cables thereon and thereby raise said booms, a transverse feed bar on said platform, and means for moving said feed bar rearwardly on the latter to feed a hay load rearwardly toward the cutting wire on said booms.

2. A hay-cutting device including a platform, wheels supporting the platform, means for connecting the platform to a tractor as a trailer thereto, a power take-off shaft rotatably mounted on the platform and adapted to be driven from said tractor, a pair of rearwardly-directed side booms spaced apart and pivotally mounted at two forward positions on said platform, a pair of upwardly-directed supports pivotally mounted on the platform at the lower ends thereof rearwardly of the pivot mountings of the side booms, a pair of cables connecting the upper ends of the supports to the booms adjacent to the rear ends thereof, a pair of pulleys rotatably mounted upon the rear ends of the booms, a further pair of pulleys rotatably mounted adjacent to the forward pivoted ends thereof, a pair of operating cables extending from one pulley to the other individually on both booms, a tension saw connected to the ends of both operating cables between the one or first pair of pulleys at the rear ends of said booms, a rocker arm pivotally mounted upon a forward portion of said platform and connected at the free oscillating end thereof to said operating cables for driving them alternately in opposite directions and thereby oscillating the tension saw along its length transversely of said booms, a crankshaft rotatably mounted on the forward portion of said platform and having a crank on one end thereof, a link pivotally connected at one end thereof to the rocker arm and at the other end to said crank, means on said power take-off shaft for driving said crankshaft, reel means rotatably mounted on the forward portions of the platform, elevating cables connected to the upper ends of both supports and partly coiled on the reel means, means for communicating rotation to said reel means at will from said power take-off shaft for rotating said reel means in one direction to wind up said elevating cables thereon and thereby raise said booms, a transverse feed bar on said platform, and means for moving said feed bar rearwardly on the latter to feed a hay load rearwardly toward the cutting wire on said booms.

3. A hay-cutting device including a platform, wheels supporting the platform, means for connecting the platform to a tractor as a trailer thereto, a power take-off shaft rotatably mounted on the platform and adapted to be driven from said tractor, a pair of rearwardly-directed side booms spaced apart and pivotally mounted at two forward portions on said platform, a pair of upwardly-directed supports pivotally mounted on the platform at the lower ends thereof rearwardly of the pivot mountings of the side booms, a pair of cables connecting the upper ends of the supports to the booms adjacent to the rear ends thereof, a pair of pulleys rotatably mounted upon the rear ends of the booms, a further pair of pulleys rotatably mounted adjacent to the forward pivoted ends thereof, a pair of operating cables extending from one pulley to the other individually on both booms, a tension saw connected to the ends of both operating cables between the one or first pair of pulleys at the rear ends of said booms, means driven from the power take-off shaft connected to the other ends of the operating cables for drawing them alternately in opposite directions and thereby oscillating the tension saw along its length transversely of said booms, a reel shaft rotatably mounted on said platform, a pair of reels fixed on the reel shaft, a clutch member on said reel shaft, a pair of elevating cables fixed at one end of each to the platform, a pair of pulleys individually connected to the upper ends of said supports, the elevating cables extending up over and forwardly again from the latter pulleys, a pair of additional pulleys rotatably mounted at the forward pivoted ends of said booms with the elevating cables extending thereover and being directed inwardly toward each other and partly wound up on said reels, a second clutch member rotatably mounted adjacent to the first-mentioned clutch member, a manually-operated lever having means connected thereto for bringing the clutch members together or separating them at will, means for communicating rotation from the power take-off shaft to the second clutch member, a transverse feed bar on said platform, and means for moving said feed bar rearwardly on the latter to feed the hay load rearwardly toward the cutting wire on said booms.

4. A hay-cutting device including a platform, wheels supporting the platform, means for connecting the platform to a tractor as a trailer thereto, a power take-off shaft rotatably mounted on the platform and adapted to be driven from said tractor, a pair of rearwardly-directed side booms spaced apart and pivotally mounted at two forward portions on said platform, a pair of upwardly-directed supports pivotally mounted on the platform at the lower ends thereof rearwardly of the pivot mountings of the side booms, a pair of cables connecting the upper ends of the supports to the booms adjacent to the rear ends thereof, a pair of pulleys rotatably mounted upon the rear ends of the booms, a further pair of pulleys rotatably mounted adjacent to the forward pivoted ends thereof, a pair of operating cables extending from one pulley to the other individually on both booms, a tension saw connected to the ends of both operating cables between the one or first pair of pulleys at the rear ends of said booms, an upright frame fixed on the forward end of the platform, a pendent oscillating rocker arm pivotally mounted adjacent the upper end thereof upon the latter frame, a pair of pulleys rotatably mounted at the lower end of the rocker arm, a lug on the upper end of the latter, a manually adjusted adjusting screw freely extending downward through said lug and terminating in a hook at the lower end, the operating cables extending from the further pair of pulleys on the booms to the pulleys on said rocker arm and over the latter upwardly to form a loop engaging with the hook on said adjusting screw, a crankshaft rotatably mounted on the forward portion of said platform and having a crank on one end thereof, a link pivotally connected at one end thereof to the rocker arm and at the other end to said crank, means on said power take-off shaft for driving said crankshaft, reel means rotatably mounted on the forward portions of the platform, elevating cables connected to the upper ends of both supports and partly coiled on the reel means, means for communicating rotation to said reel means at will from said power take-off shaft for rotating said reel means in one direction to wind up said elevating cables thereon and thereby raise said booms, a transverse feed bar on said platform, and means for moving said feed bar rearwardly on the latter to feed a hay load rearwardly toward the tension saw on said booms.

5. A hay-cutting device including a platform, wheels supporting the platform, means for connecting the platform to a tractor as a trailer thereto, a power take-off shaft rotatably mounted on the platform and adapted to be driven from said tractor, a pair of rearwardly-directed side booms spaced apart and pivotally mounted at two forward portions on said platform, a pair of upwardly-directed supports pivotally mounted on the platform at the lower ends thereof rearwardly of the pivot mountings of the side booms, a pair of cables connecting the upper ends of the supports to the booms adjacent to the rear ends thereof, a pair of pulleys rotatably mounted upon the rear ends of the booms, a further pair of pulleys rotatably mounted adjacent to the forward pivoted ends thereof, a pair of operating cables extending from one pulley to the other individually on both booms, a tension saw connected to the ends of both operating cables between the one or first pair of pulleys at the rear ends of said booms, means driven from the power take-off shaft connected to the other ends of the operating cables for drawing the operating ends of the operating cables for drawing them alternately in opposite directions and thereby oscillating the tension saw along its length transversely of said booms, reel means rotatably mounted on the forward portions of the platform, elevating cables connected to the upper ends of both supports and partly coiled on the reel means, means for communicating rotation to said reel means at will from said power take-off shaft for rotating said reel means in one direction to wind up said elevating cables thereon and thereby raising said booms, a transverse feed bar movable on said platform, a pair of rear pulleys rotatably mounted rearwardly on said platform, the latter having apertures therein adjacent to the latter pulleys, a plurality of pulleys rotatably mounted as upper and lower pairs at the forward portion of said platform, a reel shaft having a reel fixed thereon rotatably mounted at the intermediate forward portion of said platform, a gear on said power take-off shaft, a pinion on the reel shaft meshing with said gear, and a pair of feeding cables spaced apart and secured at two points to the feed bar and therefrom extending rearwardly to and over the rear pulleys on said platform through the apertures in the latter and thence forwardly to the lower pair of pulleys at the forward end of said platform, the cables extending from said lower pair of pulleys to said reel, one cable being looped about the same and from the latter extending to and over one pulley of the upper pair with the other cable also being looped about said reel and from beneath the latter extending to and over the other pulley of said upper pair at said forward end of said platform, and both cables finally extending from the last-mentioned pulleys to said two points again on said feed bar.

6. A hay-cutting device including a platform, wheels supporting the platform, means for connecting the platform to a tractor as a trailer thereto, a power take-off shaft rotatably mounted on the platform and adapted to be driven from said tractor, a pair of rearwardly-directed side booms spaced apart and pivotally mounted at two forward portions on said platform, a pair of upwardly-directed supports pivotally mounted on the platform at the lower ends thereof rearwardly of the pivot mountings of the side booms, a pair of cables connecting the upper ends of the supports to the booms adjacent to the rear ends thereof, a pair of pulleys rotatably mounted upon the rear ends of the booms, a further pair of pulleys rotatably mounted adjacent to the forward pivoted ends thereof, a pair of operating cables extending from one pulley to the other individually on both booms, a tension saw connected to the ends of both operating cables between the one or first pair of pulleys at the rear ends of said booms, an upwardly-extending frame fixed on the forward end of the platform, a pendent oscillating rocker arm pivotally mounted adjacent the upper end thereof upon the latter frame, a pair of pulleys rotatably mounted at the lower end of the rocker arm, a lug on the upper end of the latter, an adjusting screw freely extending downward through the lug and terminating in a hook at the lower end, a manually-operated crank having a threaded hole engaging said screw above said lug, the operating cables extending from the further pair of pulleys on the booms to the pulleys on said rocker arm and over the latter upwardly to form a loop engaging with the hook on said adjusting screw, a crankshaft rotatably mounted on the forward portion of said platform and having a crank on one end thereof, a link pivotally connected at one end thereof to the rocker arm and at the other end to said crank, means on said power take-off shaft for driving said crankshaft, a reel shaft rotatably mounted on said platform, a pair of reels fixed on the reel shaft, a clutch member on said reel shaft, a pair of elevating cables fixed at one end of each to the platform, a pair of pulleys individually connected to the upper ends of said supports, the elevating cables extending up over and forwardly again from the latter pulleys, a pair of additional pulleys rotatably mounted at the forward pivoted ends of said booms with the elevating cables extending thereover and being directed inwardly toward each other and partly wound upon said reels, a second clutch member rotatably mounted adjacent to the first-mentioned clutch member, a manually-operated lever having means connected thereto for bringing the clutch members together or separating them at will, means for communicating rotation from the power take-off shaft to the second clutch member, a transverse feed bar movable on said platform, a pair of rear pulleys rotatably mounted rearwardly on said platform, the latter having apertures therein adjacent to the latter pulley, a plurality of pulleys rotatably mounted as upper and lower pairs at the forward portion of said platform, a second reel shaft having a second reel fixed thereon rotatably mounted at the intermediate forward portion of said platform, a gear on said power take-off shaft, a pinion on the second reel shaft meshing with said gear, and a pair of feeding cables spaced apart and secured at two points to the feed bar and therefrom extending rearwardly to and over the rear pulleys on said platform through the apertures in the latter and thence forwardly to the lower pair of pulleys at the forward end of said platform, the cables extending from said lower pair of pulleys to said second reel, one cable being looped about the same and from the latter extending to and over one pulley of the upper pair at said forward end of said platform, with the other cable also being looped about said second reel and from beneath the latter extending to and over the other pulley of said upper pair, and both cables finally extending from the last-mentioned pulleys to said two points again on said feed bar.

7. A hay-cutting device, including a platform, a power take-off means operably mounted on a portion of the platform and adapted to be driven from a powered tractor, a pair of rearwardly-directed booms pivotally supported at their forward ends on the platform, elevating means driven from the power take-off means for raising both booms at will, means for releasing the elevating means and allowing the booms to lower by gravity to the platform, a pair of saw mountings disposed individually on the rear free ends of said booms, a tension saw mounted transversely of the latter and extending between the two saw mountings, and saw-operating means connected to the ends of said tension saw on said booms and driven from said power take-off to oscillate said tension saw transversely of said booms.

8. A hay-cutting device, including a platform, a power take-off means operably mounted on a portion of the platform and adapted to be driven from a powered tractor, a pair of rearwardly-directed booms pivotally supported at their forward ends on the platform, elevating means driven from the power take-off means for raising both booms at will, means for releasing the elevating means and allowing the booms to lower by gravity to the platform, a pair of saw mountings disposed individually on the rear free ends of said booms, a tension saw mounted transversely of the latter and extending between the two saw mountings, saw-operating means connected to the ends of said tension saw on said booms and driven from said power take-off to oscillate said tension saw transversely of said booms, a movable feeding member located on said platform, and means driven from said power take-off for moving said feeding member rearwardly and feeding a hay load rearwardly to said tension saw.

ELMER W. BALDWIN.

REFERENCES CITED

The following references are of record in the file of this patent:

UNITED STATES PATENTS

| Number | Name | Date |
|---|---|---|
| 1,465,865 | Pue et al. | Aug. 21, 1923 |
| 1,592,401 | Walker | July 13, 1926 |
| 2,284,919 | Nielson | June 2, 1942 |